April 28, 1953  J. F. ARMSTRONG ET AL  2,636,516
FUEL CONTROL SAFETY VALVE
Filed March 13, 1947

INVENTORS
JAMES FRED ARMSTRONG
JAMES T. W. MOSELEY
BY *George R. Ericson*
ATTORNEY Patented Apr. 28, 1953

2,636,516

UNITED STATES PATENT OFFICE 2,636,516

FUEL CONTROL SAFETY VALVE

James Fred Armstrong, Detroit, Mich., and James T. W. Moseley, Clayton, Mo., assignors to Carter Carburetor Corporation, St. Louis, Mo., a corporation of Delaware Application March 13, 1947, Serial No. 734,433

2 Claims. (Cl. 137—641)

This invention relates to safety valve devices particularly adaptable for use with high pressure fuel supply systems for internal combustion engines.

Where an engine is equipped to utilize such normally gaseous fuels as butane, it is customary to store the fuel at high pressure and release the same to the engine through a regulator which reduces the pressure to a usable range. In case the regulator fails to operate properly, the high pressure gas may leak therepast when the engine is out of operation resulting in wastage, a fire hazard, and polluted ambient atmosphere. Thus, it is desirable to provide an additional safety valve which insures positive cutting off of the fuel supply except when the engine is operating. Moreover, it is also desirable to provide a safety device which interrupts the fuel supply in case of an engine failure, such as in the pressure lubricating system. However, the safety device must be arranged to supply fuel during the cranking period when various forces and pressures generated incidental to such low speed operation of the motor may not be sufficient to open the safety valve.

Accordingly, it is the main object of the present invention to provide a novel safety valve device for high pressure fuel systems of internal combustion engines.

Another object is to provide such a safety valve device which cuts off the fuel supply except when subjected to a fluid pressure normally generated by the engine, such as in the lubricating system.

Another object is to provide such a safety valve device which normally cuts off the fuel supply, but is adapted to temporarily supply fuel during the cranking period.

Still another object is to provide such a safety valve of rugged, simple, leak-proof structure.

Figure 1:
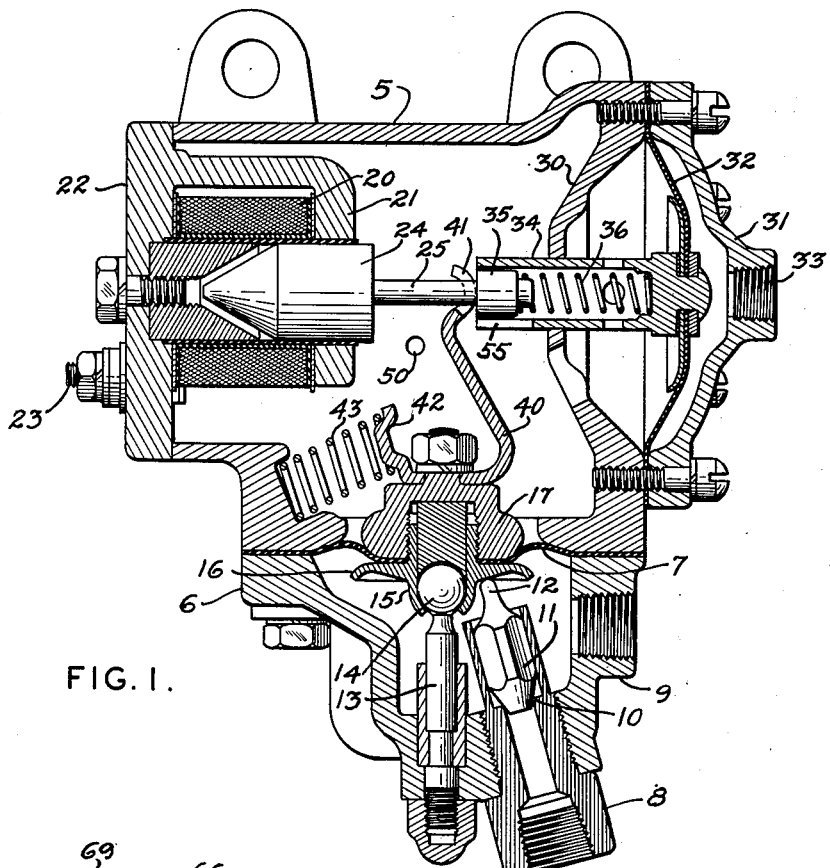

These objects and other more detailed objects hereafter appearing are attained by the device illustrated in the accompanying drawing in which Fig. 1 is a sectional view of the safety valve and control.

Figure 2:
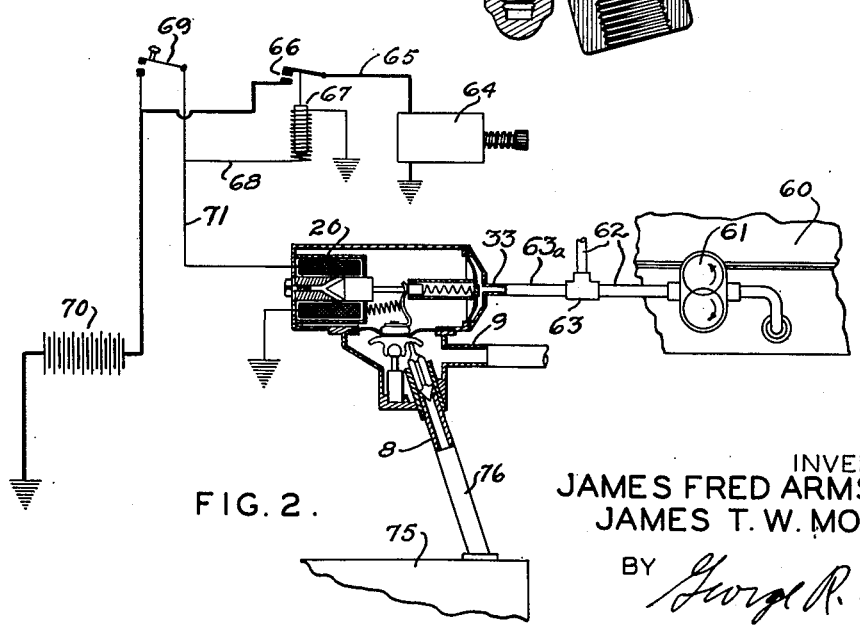

Fig. 2 is a diagrammatic view showing the safety valve device and other accessories incorporated with an internal combustion engine.

Figure 1 illustrates the detail construction of the safety valve. The device comprises upper and lower casings 5 and 6 having opposed flanges securing in position a diaphragm 7. Lower casing 6 is provided with an inlet fitting 8 and outlet fitting 9 for the gaseous fuel. Inlet fitting 8 terminates in a valve seat element 10 which carries a needle valve 11 controlling the same. Valve 11 has an upwardly extending tip 12. A pin 13 projects from the lower wall of casing 6 and carries a ball 14 at its upper extremity which forms a universally pivoted mounting for a casting 15, having an annular collar 16, which overlies and engages valve tip 12. Casting 15 is threadedly secured to a member 17, the center portion of diaphragm 7 being tightly gripped between the dish-like elements 16 and 17 which sealingly engage and reinforce opposite sides of the diaphragm 7.

Mounted in the left hand portion of upper casing 5 is a solenoid 20 carried in an open sided casing 21 projecting from a removable cover element 22. Terminal 23 provides for connecting the solenoid into the starter circuit. The solenoid is provided with an armature 24 having a stem 25 projecting inwardly therefrom.

At the opposite side of upper casing 5 there is provided a web 30 and cap 31 which, at their edges, secure in position a diaphragm 32. A fitting 33 in the cap provides for connection to the oil pressure line of the engine. A tube 34 is rigidly connected to the center of diaphragm 32 and slidably receives a plunger 35 at the end of stem 25. The plunger is normally urged towards the left by a coiled spring 36 seated within tube 34. The tube, plunger, and spring form a resiliently telescoping connection between armature 24 and diaphragm 32.

Projecting upwardly from member 17 secured to diaphragm 7 is an arm 40 having a clevis 41 at its upper extremity slidably received on stem 25. Arm 40 has an opposite extension 42 between which and casing 5 there is compressed a coil spring 43 which normally urges arm 40 and annular collar 16 in the clockwise direction so as to close needle valve 11 against its seat 10. Casting 15, member 17, arm 40, and its extension 42 comprise a valve actuator arranged to be tilted by the solenoid, when the engine is cranked for starting, and by oil pressure, when the engine is operating under its own power, to release valve 11, permitting the same to open for the supply of high pressure gas.

Upper casing 5 is provided with an atmospheric vent 50 to prevent the trapping of air and moisture within the casing.

During normal operation, the telescoping connection between armature 24 and oil pressure diaphragm 32, functions to limit the axial pressure applied through the connection from diaphragm 32 to the armature. When the telescoping connection collapses, arm 40 enters slot 55 in tube 34 so that the tube and diaphragm 32 may continue in their leftward movement as far as permitted by spring 36. Diaphragm 7, of course, seals the lower casing so that no gas can escape therefrom except through the outlet fitting.

Diagrammatic Figure 2 shows a portion of the lower part 60 of an internal combustion engine having an oil pump 61 for supplying lubricant under pressure to a conduit 62 leading to various parts to be lubricated. A T 63 and tube 63a connect the oil supply line to fitting 33 of the safety valve casing. A starter motor is indicated at 64 and connected by a lead 65 to the points 66 of a relay 67. The primary of the relay is connected by a lead 68 through starter switch 69 to battery 70. Current is also led from the battery through the starter switch and a lead 71 to solenoid 20. The battery, solenoids 67 and 20, and the starter motor are grounded, as indicated. The high pressure gas supply enters the safety valve from tank 75 through a pipe 76 connected to fitting 8 and is discharged through outlet fitting 9 to the carburetor of the engine (not shown). A suitable arrangement of regulator and carburetor for such a system is disclosed and claimed in a copending application, Serial No. 717,932, filed December 23, 1946, in the name of James F. Armstrong et al., now Patent 2,469,942 issued May 10, 1949.

The arrangement is such that when the starter switch is closed to crank the engine, safety valve 11 will be opened by solenoid 20 to admit a supply of gaseous fuel for starting. When the engine starts to run under its own power, oil from the pressure lubricating system activates diaphragm 32 so as to hold the safety valve open and continue the supply of fuel. In case the engine runs out of oil or the lubricating system fails, the fuel supply will be automatically cut off. Also, when the engine is not in operation, no fuel can pass the normally closed safety valve.

Broadly speaking, other forces incidental to operation of the engine may be substituted for the starter initiated current and the oil pressure. For instance, the valve may be actuated incident to turning on of the ignition switch and/or the fluid pressure differential available in the intake or exhaust manifold may be substituted for the pressure from the lubricating system.

The invention may be modified, accordingly, and in various respects as will occur to those skilled in the art and the exclusive use of all such modifications as come within the scope of the appended claims is contemplated.

We claim:
1. A valve device for controlling pressure fluid flow comprising a chamber having a valve seat forming port in one wall and a flexible diaphragm forming another wall thereof, a needle valve on said seat and projecting into said chamber and longitudinally movable to and from said seat, a valve actuator structure including a part extending through said diaphragm and opposing, dish-like elements sealingly engaging and reinforcing opposite sides of said diaphragm, a universal pivot mounting projecting inwardly from one of said chamber walls, axially of said diaphragm, and connected to said actuator structure to provide a universal pivotal support for said actuator structure, one of said elements having a peripheral flange symmetrical about said part and said pivot mounting and on the valve chamber side of said diaphragm, said last element normally engaging said valve, an arm projecting from the other of said elements, and means for acting upon said arm to shift said diaphragm and said actuator, and thereby selectively apply and relieve closing forces on said valve.

2. A safety valve device for controlling a fluid supply comprising a pair of chambers including a valve chamber and an actuator chamber, a valve controlled inlet including a valve and guide in said valve chamber, a flexible diaphragm between said chambers, a valve actuator mounted on said diaphragm and extending into both chambers, a universal pivot structure in said valve chamber and connected to the actuator therein, said actuator engaging said valve, a resiliently connected power operator for said valve actuator including a shaft provided with an axial guide at one end and having a part in abutting relation with said actuator, a tubular axial guide for the opposite end of said shaft having an abutment, and a compressible element between said shaft and abutment to bias said actuator in one direction, and compressible means between said actuator and casing opposing the action of said compressible element.

JAMES FRED ARMSTRONG.
JAMES T. W. MOSELEY.

References Cited in the file of this patent
UNITED STATES PATENTS

| Number | Name | Date |
|---|---|---|
| 596,861 | Durand | Jan. 4, 1898 |
| 1,234,949 | Stack | July 31, 1917 |
| 1,440,702 | Russell | Jan. 2, 1923 |
| 1,603,005 | Flam | Oct. 12, 1926 |
| 1,885,433 | Hall | Nov. 1, 1932 |
| 2,055,347 | Hackman | Sept. 22, 1936 |
| 2,194,276 | Carlson | Mar. 19, 1940 |
| 2,221,942 | Carlson | Nov. 19, 1940 |
| 2,269,016 | Gille | Jan. 6, 1942 |
| 2,358,999 | Ray | Sept. 26, 1944 |
| 2,469,942 | Armstrong et al. | May 10, 1949 |